(12) United States Patent
Haider et al.

(10) Patent No.: US 12,310,463 B2
(45) Date of Patent: May 27, 2025

(54) QUICK-RELEASE SWIVEL LATCHES

(71) Applicant: Aspetto, Inc., Fredericksburg, VA (US)

(72) Inventors: Abbas Haider, Sterling, VA (US); Robert Davis, Stafford, VA (US)

(73) Assignee: Aspetto, Inc., Fredericksburg, VA (US)

( * ) Notice: Subject to any disclaimer, the term of this patent is extended or adjusted under 35 U.S.C. 154(b) by 592 days.

(21) Appl. No.: 17/733,753

(22) Filed: Apr. 29, 2022

(65) Prior Publication Data
US 2022/0349431 A1 Nov. 3, 2022

Related U.S. Application Data

(60) Provisional application No. 63/181,973, filed on Apr. 30, 2021.

(51) Int. Cl.
*A44B 11/25* (2006.01)
(52) U.S. Cl.
CPC .................... *A44B 11/2542* (2013.01)
(58) Field of Classification Search
CPC .............. A44B 11/2542; A44B 11/006; A44B 11/2592; F16B 21/073
See application file for complete search history.

(56) References Cited

U.S. PATENT DOCUMENTS

| 4,443,916 | A |   | 4/1984 | Tiemann |
| 4,581,953 | A | * | 4/1986 | Walston .................. F16C 11/04 74/502 |
| 4,777,665 | A |   | 10/1988 | Akamatsu |
| 5,263,234 | A |   | 11/1993 | Fudaki |
| 5,319,836 | A |   | 6/1994 | Ida |
| 5,471,716 | A |   | 12/1995 | Takahashi |
| 5,564,131 | A | * | 10/1996 | Anscher ............. A44B 11/2592 24/669 |
| 5,774,956 | A |   | 7/1998 | French et al. |
| 6,003,213 | A | * | 12/1999 | Keller .................. A44C 5/2057 24/615 |
| 6,154,936 | A |   | 12/2000 | Howell et al. |

(Continued)

FOREIGN PATENT DOCUMENTS

| CN | 110840018 A | 2/2020 |
| FR | 3021846 A1 | 12/2015 |

OTHER PUBLICATIONS

International Search Report and Written Opinion in related PCT Application No. PCT/US22/27100, mailed Sep. 14, 2022.

*Primary Examiner* — David M Upchurch
(74) *Attorney, Agent, or Firm* — Sam Pierce

(57) ABSTRACT

A quick-release swivel latch may include male and female components configured to selectively connect to, swivel relative to, and detach from one another. The male component may include an arc slot and a central indent, while the female component may include outer surfaces that collectively form a chamber for receiving an insertable portion of the male component. The top surface of the female component may include a cantilever wall having a front lip and a central protrusion corresponding in shape, size, and/or arrangement to and configured to engage the arc slot and ball indent slot on the male component. These corresponding features, once engaged, may enable the male and female components to swivel in one or more dimensions relative to one another once connected, and a user to pull up on the cantilever wall to quickly disengage the male and female components.

20 Claims, 7 Drawing Sheets

(56) References Cited

U.S. PATENT DOCUMENTS

| | | |
|---|---|---|
| 6,637,083 B1 | 10/2003 | Howell |
| 7,448,116 B1 | 11/2008 | Howell |
| 7,657,978 B2 | 2/2010 | Lin |
| 8,850,670 B2 | 10/2014 | Fiedler |
| 9,009,931 B2 | 4/2015 | Jensen |
| 9,119,445 B2 * | 9/2015 | Humbert ............ A44B 11/2526 |
| 9,603,418 B2 | 3/2017 | Grimm et al. |
| 2006/0070215 A1 | 4/2006 | Sung |
| 2015/0074957 A1 | 3/2015 | Grimm et al. |
| 2016/0000191 A1 * | 1/2016 | Haider ............... A44B 11/2592 24/651 |
| 2020/0367610 A1 | 11/2020 | Westra et al. |

\* cited by examiner

QUICK-RELEASE SWIVEL LATCHES

CROSS-REFERENCE TO RELATED APPLICATION

This application is a non-provisional of, and claims priority under 35 U.S.C. § 119 to, U.S. Provisional Patent Application No. 63/181,973, filed Apr. 30, 2021, the entire contents of which are fully incorporated herein by reference.

FIELD OF THE INVENTION

The disclosed technology generally relates to quick-release latches and other connectors, and more particularly to quick-release latches and other connectors having mating components configured to swivel with respect to one another once engaged.

BACKGROUND

Latches and other types of connectors of various forms are often used as fasteners on a variety of items, such as clothing, bags, backpacks, seatbelts, and the like. Latches suited for these purposes often have a locking mechanism that can be selectively released (e.g., via a lever or press tabs) to allow the matching components of the latch to disengage. Existing latches can be cumbersome to release, often requiring significant force and/or an odd movement from a user to selectively release the mated components. These limitations can prove disadvantageous in situations where a user must be able to quickly disconnect opposing components of a latch, such as for safety reasons (e.g., on body armor, military or law enforcement uniforms, safety vests, etc.). Further, the static nature of existing latches may limit performance for the item on which the latch is equipped (e.g., by limiting its range of motion and flexibility) and be uncomfortable to the user wearing or interacting with the item. These limitations become more significant for particular professions that require superior performance and/or wearing an item over long periods of time (e.g., law enforcement, military, professional sports, etc.).

Accordingly, there is a need for improved quick-release swivel latches and other connectors that address the above-mentioned deficiencies. Embodiments of the present disclosure are directed to these and other considerations.

SUMMARY OF THE INVENTION

The disclosed technology provides quick-release swivel latches and other connectors. In one example embodiment, the disclosed technology provides a quick-release swivel latch including a male component and a female component that selectively engage with each other. The male and female components may each include one or more notches for attaching removable straps. The male component may include an arc slot (or rotary slot) and a ball indent slot (or swivel slot). The female component may include a top surface, one or more side surfaces, and a bottom surface that together form a receiving compartment into which the male component may be inserted to fasten the quick-release swivel latch in place. The top surface of the female component may include a cantilever wall, which itself may include a front lip protrusion configured to engage the arc slot of the male component, and a central protrusion configured to engage the ball indent slot of the male component. When the male and female components are in a connected position such that the central protrusion and front lip of the female component engages the ball indent and arc slot of the male component, respectively, the male and female components can swivel in at least one dimension relative to one another while remaining in the connected position. When it is time to release the latch, the cantilever wall of the female component may be configured to be pulled outwardly (e.g., via a rope threaded through a hole thereof or a handle extending therefrom) from the male component to disengage the central protrusion and front lip of the female component from the ball indent and arc slot of the male component, respectively, and in turn disconnect the female component from the male component.

The corresponding features of the male and female components (e.g., the central protrusion and front lip of the female component corresponding to the ball indent and arc slot of the male component, respectively) may enable the male component to be inserted into and engaged by the female component when the components are in a connection position and selectively released from the female component when the components are in a disconnected or detached position. The shape and relative arrangement of the corresponding features may also enable the male and female components to swivel or rotate with respect to one another once engaged, and in turn provide increased performance (e.g., greater range of motion and flexibility) and user comfort of the item (e.g., clothing, vest, backpack, etc.) to which the latch is affixed while still being configured to quickly release with a simple and convenient single-motion of the user. For example, for a latch on a vest, a user may be able to pull a rope threaded through a hole in the cantilever wall away from his or her body in a single motion that both disengages the corresponding features of the male and female components and at least partially removes the vest from his or her torso.

BRIEF DESCRIPTION OF THE DRAWINGS

Reference will now be made to the accompanying figures, which are not necessarily drawn to scale, and wherein.

DETAILED DESCRIPTION

Figure 1:
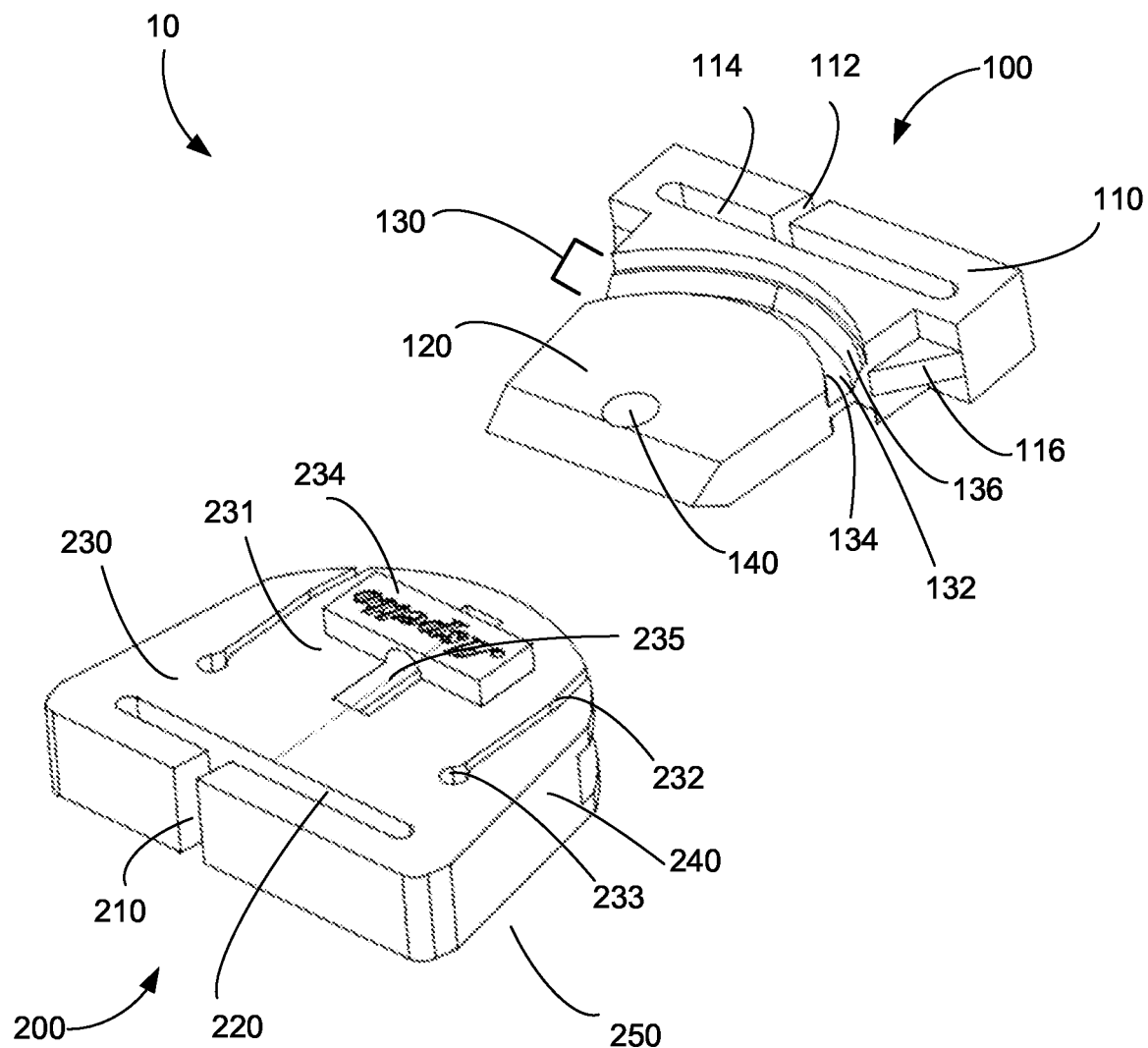
FIG. 1 shows a top isometric view of a quick-release latch in an unattached position in accordance with one or more embodiments of the present disclosure.

Some implementations of the disclosed technology will be described more fully with reference to the accompanying drawings, which form a part hereof, and in which is shown by way of illustration various example embodiments in which aspects of the disclosure may be practiced. It is to be understood that other embodiments may be utilized, and structural and functional modifications may be made without departing from the scope of the present disclosure. Aspects of the disclosure are capable of other embodiments and of being practiced or being carried out in various ways. In addition, it is to be understood that the phraseology and terminology used herein are for the purpose of description and should not be regarded as limiting. Rather, the phrases and terms used herein are to be given their broadest interpretation and meaning.

By way of introduction, aspects discussed herein may relate to quick-release latches and other connectors, including those having first (e.g., male) and second (e.g., female) components configured to swivel with respect to one another once engaged. This type of quick-release swivel latch may provide advantages over other types of connectors by enabling a user to access his or her full range of motion while more comfortably wearing the latch on his or her person, such as on a uniform, body armor, tactical vest, backpack, etc. worn in particularly physical professions (e.g., military, law enforcement, professional sports, etc.). These types of latches may also better allow a user to quickly disconnect the opposing components of the latch, such as for safety reasons (e.g., on body armor, military or law enforcement uniforms, safety vests, etc.). These types of latches may also provide increased load bearing capability as one or more protrusions of the first and second components, as further described below, may jointly carry any load. As such, the following discussion describes exemplary embodiments of a quick-release swivel latch incorporating one or more of the above-described features.

FIGS. 1-5 provide an example embodiment of a quick-release swivel latch 10. As shown in the top isometric view of FIG. 1, top view of FIG. 2 (detached position), and top isometric view of FIG. 5 (connected position), quick-release swivel latch 10 may include a male component 100 and a female component 200 designed to selectively connect with and detach from one another. Male component 100 and female component 200 may be constructed out of any known material, including plastics (e.g., Acrylonitrile Butadiene Styrene (ABS), high-density polyethylene, polystyrene, etc.), metals, carbon fiber and other composites, and combinations thereof, based on desired strength, toughness, impact resistance, heat resistance, and manufacturing cost. For example, ABS may be best suited in applications that require strength, toughness, impact resistance, and/or heat resistance while still being light and inexpensive to manufacture. High-density polyethylene may be best suited in applications that require good ductility, tensile strength, and impact and heat resistance. Polystyrene may be best suited in applications where impact resistance is the top priority. In some embodiments, male component 100 and/or female component 200 may each be cast or rotationally molded as a continuous single material (e.g., of a hard plastic or carbon fiber). In other embodiments, male component 100 and/or female component 200 may each be assembled from a plurality of parts made of different materials.

Figure 3A:
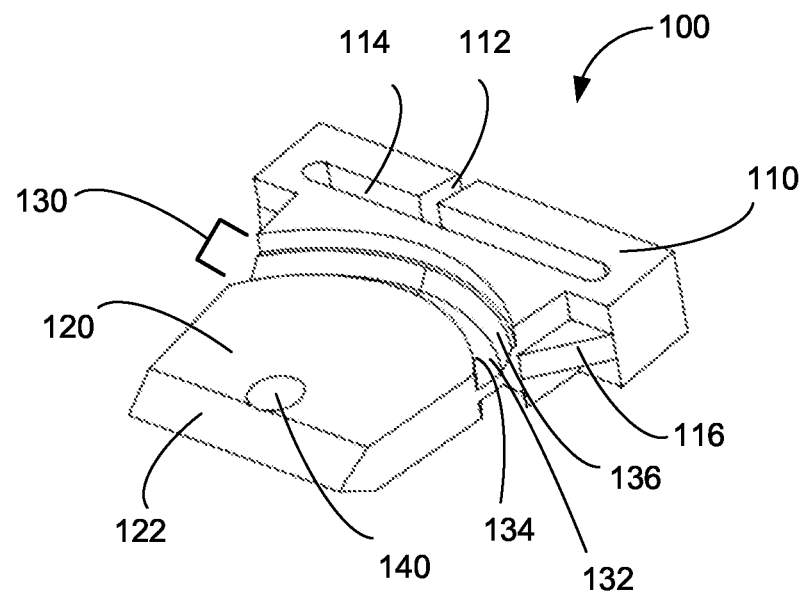
FIGS. 3A-3C show side perspective (3A) and cross-sectional (3B and 3C) views, respectively, of a first component of a quick-release latch in accordance with one or more embodiments of the present disclosure.
Figure 3B:
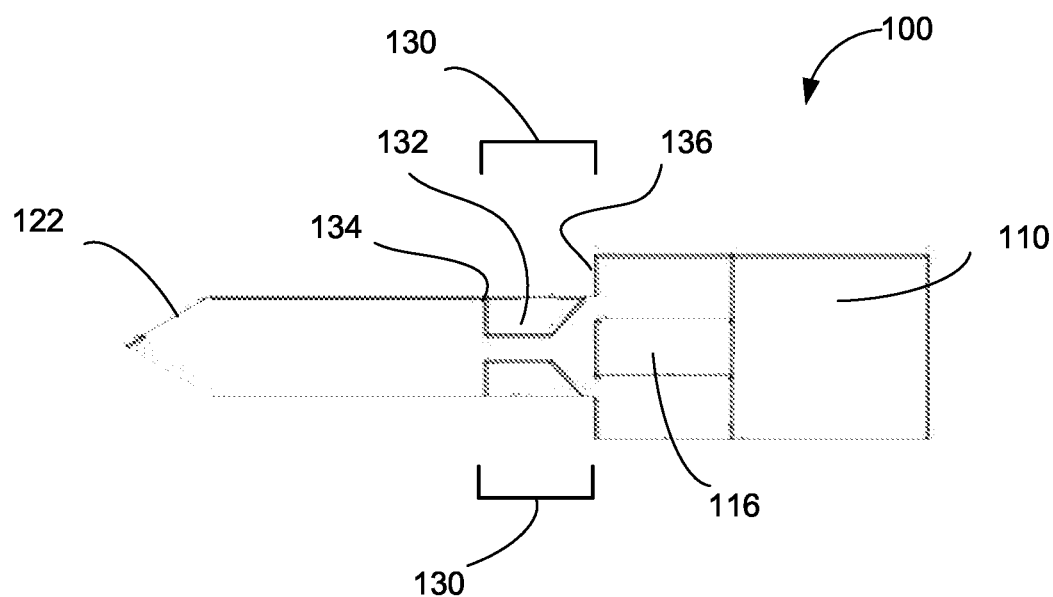
Figure 3C:
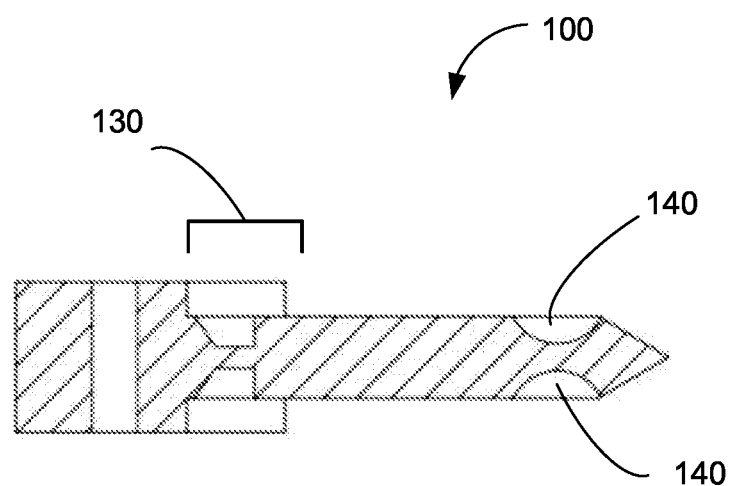

As shown more clearly in the side perspective and cross-sectional views of FIGS. 3A-3C respectively, male component 100 may include a base 110 and a front section 120 separated by an arc slot 130 (or rotary slot) along with a ball indent slot 140 (or swivel slot or ball indentation) disposed on a front portion of front section 120. As particularly shown in FIG. 3B, the vertical thickness of base 110 may be greater than the vertical thickness of front section 120. Base 110 may include a mouth 112 leading to an opening 114 designed to be fitted with a removable strap or belt (e.g., of the clothing article, backpack, etc. being worn). Mouth 112 and opening 114 may be of any shape and size as needed to hold a strap or belt. Additionally, mouth 112 may include one or more biting hooks projecting into opening 114 that would help to prevent a strap or belt from sliding out. Base 110 of male component 100 may also include one or more sidewalls 116, which may taper as they extend towards front section 120 to provide additional structural support for male component 100 as front section 120 is inserted into female component 200 and/or serve as guides during the insertion process. The front portion of front section 120 may taper as well, which can provide several advantages. For example, it may limit the extent to which the male component 100 contacts the internal walls of the female component 200 during insertion and rotation, thereby reducing excessive damage and enabling rotation with minimal friction. It also expands the potential insertion angles of the male component 100 into the female component 200, making it easier to attach.

Defining a front edge of base 110, arc slot 130 may have a size and shape that corresponds with that of a front lip 237 of female component 200, as further discussed below with respect to FIGS. 4A-4D. Although not shown, it is contemplated that multiple arc slots 130 may be used in embodiments with multiple front lips 237 of female component 200. In some embodiments, multiple arc slots 130 may be used to provide the added benefit of improved load bearing capacity and increased stability during rotation. The amount of curvature of arc slot 130 may be modified by increasing or decreasing the radius of arc slot 130. That is, as the radius of arc slot 130 is decreased, the curvature of arc slot 130 will increase. Being able to vary the curvature of arc slot 130 provides a benefit of allowing more or less rotation between male component 100 and female component 200, as further discussed below. The curvature of arc slot 130 may be selected based on overall size of quick-release swivel latch 10 to achieve ideal structural rigidity and rotation and with the desired tolerance to avoid unwanted wear interference between surfaces. In some embodiments, arc slot 130 and corresponding front lip 237 of female component 200 may have the same amount of curvature, but different arc lengths. For example, the arc length of front lip 237 may be shorter than the arc length of arc slot 130. This configuration may enable front lip 237 to remain within the arc length of arc slot 130 when male component 100 and female component 200 swivel or rotate with respect to each other.

Arc slot 130 may include a lower surface 132, a front wall 134, and a back wall 136. Lower surface 132 may be flat, that is, parallel to the top surface(s) of base 110 and front section 120, to prevent any obstruction during rotation. The surface area of lower surface 132 may be varied by adjusting the width and/or length of lower surface 132, and may be selected based on desired load bearing capacity. That is, a greater surface area of lower surface 132 may help to achieve a greater load bearing capacity of quick-release swivel latch 10.

Front wall 134 may be configured at a 90-degree angle with respect to lower surface 132, and may be shorter than back wall 136 (e.g., front wall 134 may be half as tall as backwall 136). The taller back wall 136 may help serve as a backstop to prevent over-insertion of male component 100 into female component 200, and enable male component 100 and female component 200 to lock tightly in place. The heights of front wall 134 and back wall 136 may be varied to provide a shallower or deeper arc slot 130. As further discussed below, this feature provides a benefit in that a deeper arc slot 130 may allow male component 100 and female component 200 to more tightly fit together, while a shallower arc slot 130 may allow a user to more easily disengage male component 100 and female component 200. In general, the depth of arc slot 130 may be selected based on desired load bearing capacity and size of quick-release swivel latch 10. For example, a depth of 2-4 millimeters may help to balance proper load bearing capacity, effort required to disengage male component 100 and female component 200, and manufacturing costs.

Back wall 136 may be configured at an angle or on a curve with respect to lower surface 132. That is, back wall 136 may have a top segment configured at a 90-degree angle with respect to lower surface 132, and a bottom segment configured such that it is on an angle or curve with respect to lower surface 132. As further discussed below, this feature provides a benefit of ensuring male component 100 fits properly within female component 200, and that the two components can swivel or rotate with respect to one another.

Front section 120 of male component 100 may include a ball indent slot (or swivel slot) 140. Ball indent slot 140 may help to provide overall structural rigidity, rotation control, and shock load absorption for quick-release swivel latch 10. The size and shape of ball indent slot 140 may correspond in size, shape, and alignment with a central protrusion 236 of female component 200, as further discussed below. The diameter of ball indent slot 140 may be varied to provide a smaller or larger ball indent slot 140. As further discussed below, this feature provides a benefit of being able to vary how tightly male component 100 and female component 200 fit together. For example, a diameter of 6-10 millimeters may help to balance proper structural rigidity, frictional surface area, and effort required to disengage male component 100 and female component 200. The depth of ball indent slot 140 may be selected based on desired functionality and size of quick-release swivel latch 10. That is, a deeper ball indent slot 140 may increase the difficulty in being able to detach male component 100 and female component 200, while a shallower ball indent slot may decrease ease of rotation.

Front section 120 of male component 100 may be slightly tapered as it extends toward a front pointed edge 122. This tapering may allow male component 100 to be inserted into female component 200 at any angle. This tapering may also allow male component 100 to freely rotate within female component 200 without causing excessive damage to male component 100 or female component 200 by allowing only a portion of front section 120 to come in contact with one or more internal surfaces of female component 200.

As shown in FIGS. 3B-3C, arc slot 130 and ball indent slot 140 of male component 100 may be included on one or both sides of male component 100 such that top and bottom surfaces of male component 100 are reversible. Male component 100 may thus engage with female component 200 regardless of which side of male component 100 is facing up or down. This feature provides a benefit in that a user may quickly engage male component 100 and female component 200 without needing to worry that male component 100 is oriented properly (e.g., in an emergency or safety-related situation or if a strap is inconveniently twisted thereby rotating male component 100 by 180°). As described above, front section 120 of male component 100 may include a front pointed edge 122 to allow male component 100 to more easily be inserted into female component 200.

As shown more clearly in the side perspective, cross-sectional, bottom front perspective and bottom views of FIGS. 4A-4D respectively, female component 200 may include a mouth 210 leading to an opening 220 designed to be fitted with a removable strap or belt. Mouth 210 and opening 220 may be of any shape and size as needed to hold a strap or belt. Additionally, mouth 210 may include one or more biting hooks projecting into opening 220 that would help to prevent a strap or belt from sliding out. A strap or belt included on female component 200 may be of the same or different size, shape, thickness, material, etc., as a strap or belt included on male component 100, as previously described. Thus, opening 220 of female component 200 may be of the same or different size or shape as opening 114 of male component 100. Certain situations may invite, for example, a thicker or heavier strap included on male component 100 than on female component 200 to enable male component 100 to be more tightly fixed to a specific point (e.g., on clothing, equipment, etc.). Including a strap or belt on both male component 100 and female component 200 provides a benefit of being able to use quick-release swivel latch 10 on certain clothing or equipment, such as body armor, vests, and the like.

Female component 200 may also include a top surface 230, one or more side surfaces 240, and a bottom surface 250, together defining a receiving compartment 260 into which at least a portion (e.g., front section 120) of male component 100 may be inserted to fasten quick-release swivel latch 10 in place. Additionally, one or more side surfaces 240 of female component 200 may include a slight front inclination to help reduce friction as male component 100 is inserted into female component 200, and to stop male component 100 from rotating any further in either direction. In some embodiments, the vertical height of the receiving compartment 260 may be greater than the vertical thickness of the front section 120 such that at least a portion of the front section 120 may be inserted into the receiving compartment 260, as discussed herein. In some embodiments, the vertical height of the receiving compartment 260 may be less than the vertical height of the base 110 such that the base 110 may not be inserted into the receiving compartment 260.

Figure 2:
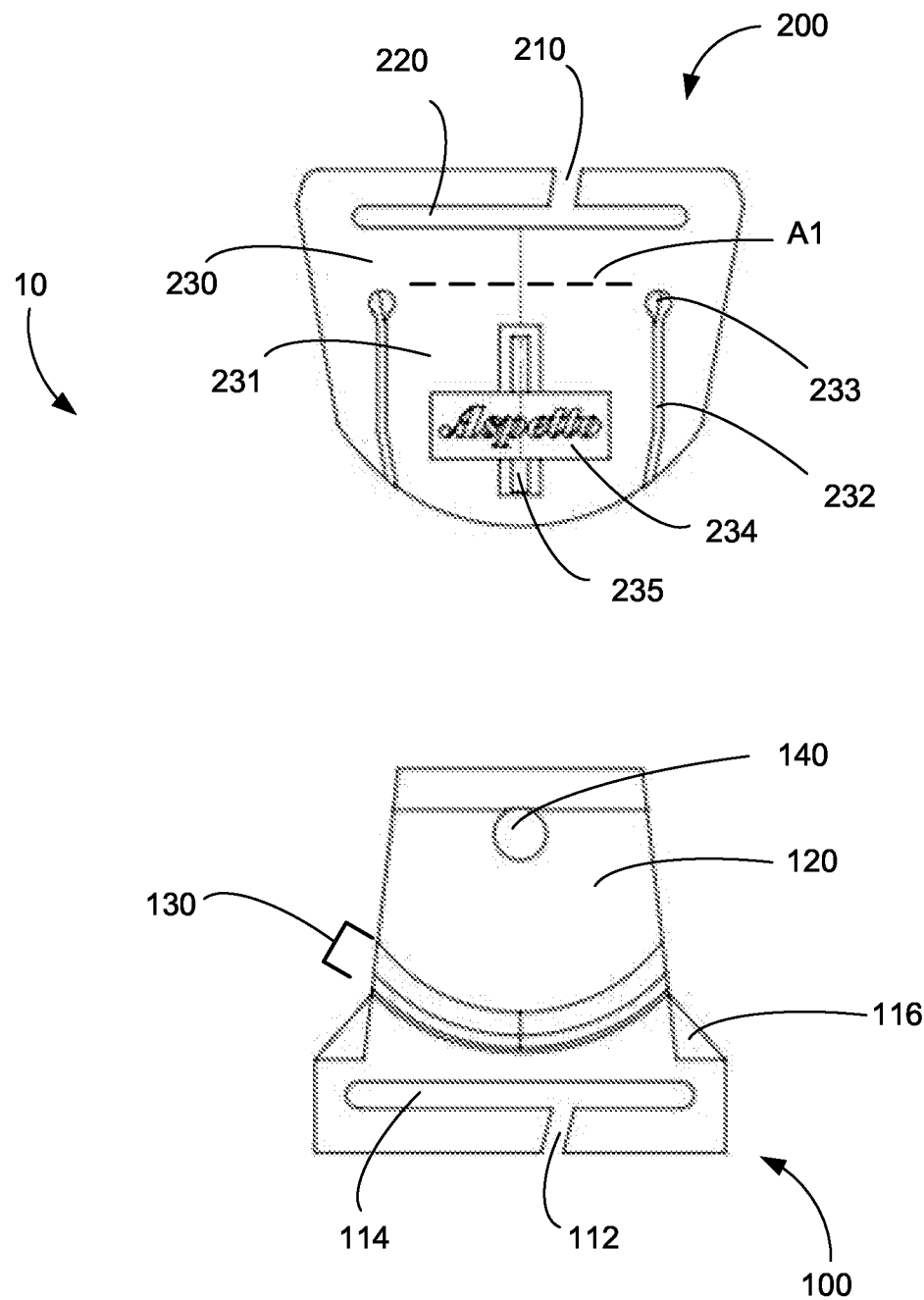
FIG. 2 shows a top view of a quick-release latch in accordance with one or more embodiments of the present disclosure.

Top surface 230 of female component 200 may include a cantilever wall 231 spaced between a pair of axial slots 232. As shown in FIG. 2, cantilever wall 231 may be fixed at a cantilever axis A1 where most stress occurs. To increase the fatigue life of cantilever wall 231, each of the axial slots 232 may terminate at a stress reliever hole 233. Cantilever wall 231 may also include an extension 234 projecting from cantilever wall 231 where a string, rope, or the like, can be fitted through hole 235 so that a user may pull cantilever wall 231 to disengage female component 200 from male component 100.

Figure 4A:
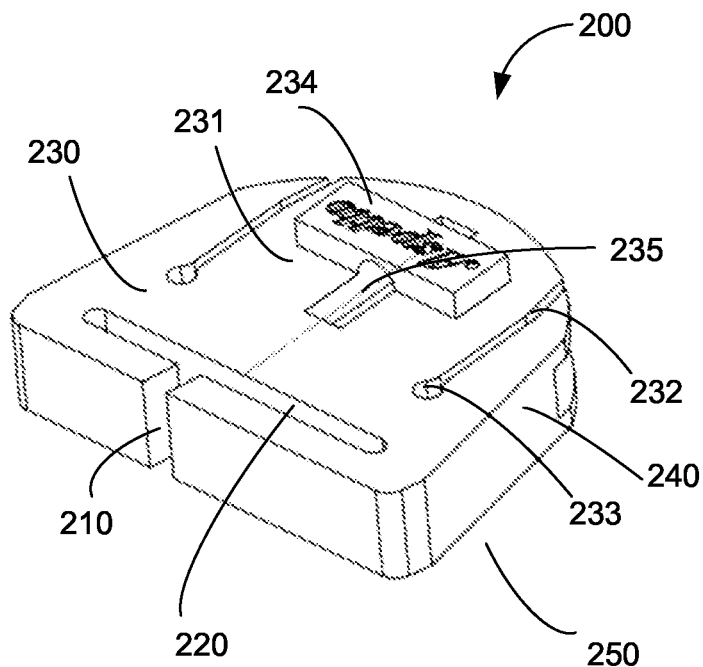
FIGS. 4A-4D show side perspective (4A), cross-sectional (4B), bottom front perspective (4C), and bottom (4D) views, respectively, of a second component of a quick-release latch in accordance with one or more embodiments of the present disclosure.
Figure 4B:
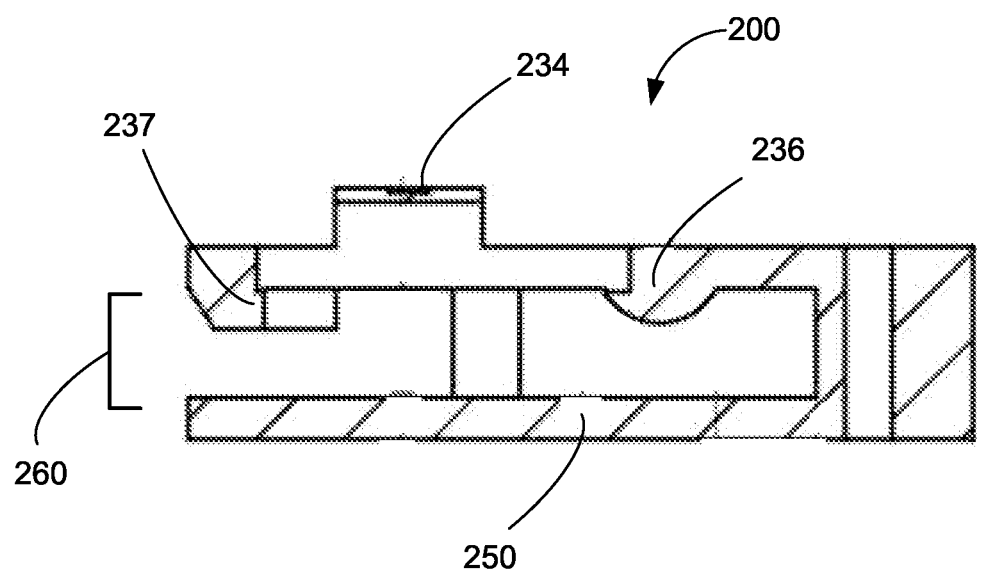
Figure 4C:
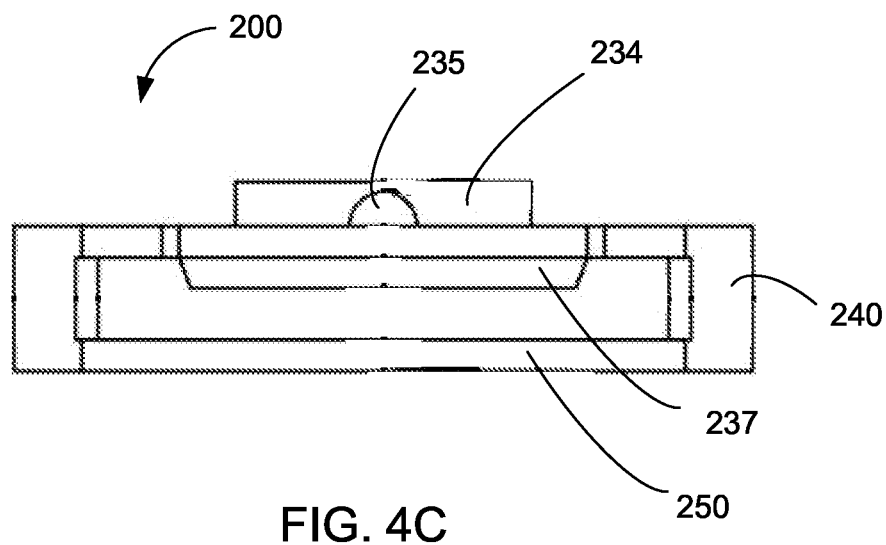

As shown in FIG. 4B, cantilever wall 231 may include a protrusion 236 on an inside surface of cantilever wall 231 that may correspond (e.g., in size, shape, and/or alignment) with ball indent slot 140 of male component 100 when male component 100 and female component 200 are connected. Cantilever wall 231 may also include a front lip 237 on the inside surface of cantilever wall 231 that may correspond (e.g., in size, shape, and/or alignment) with arc slot 130 of male component 100 when male component 100 and female component 200 are connected. As previously described, the size of such matching features may enable male component 100 and female component 200 to fit together more tightly when engaged, and/or enable a user to more easily disengage the components from one another. Specifically, front wall 134 of arc slot 130, being configured at a 90-degree angle with respect to lower surface 132 of arc slot 130, may help front lip 237 of female component 200 fit tightly in place when male component 100 is inserted into female component 200. Additionally, back wall 136 of arc slot 130, being configured on an angle or curve with respect to lower surface 132 of arc slot 130, may help ensure male component 100 is not over-inserted into female component 200, and ensure front lip 237 of female component 200 can easily find arc slot 130 of male component 100. In some embodiments, as discussed above, the amount of curvature of front lip 237 and arc slot 130 may be the same, yet their respective arc lengths different.

Figure 4D:
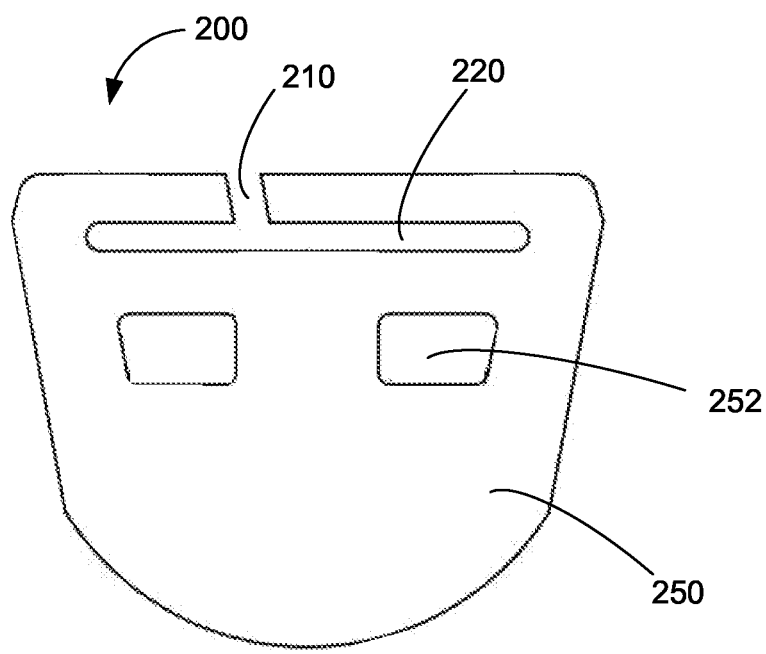

As shown in FIG. 4D, bottom surface 250 of female component 200 may also include one or more through-holes 252 to allow air, water, sand, dirt, and the like, to easily pass through quick-release swivel latch 10.

Figure 5:
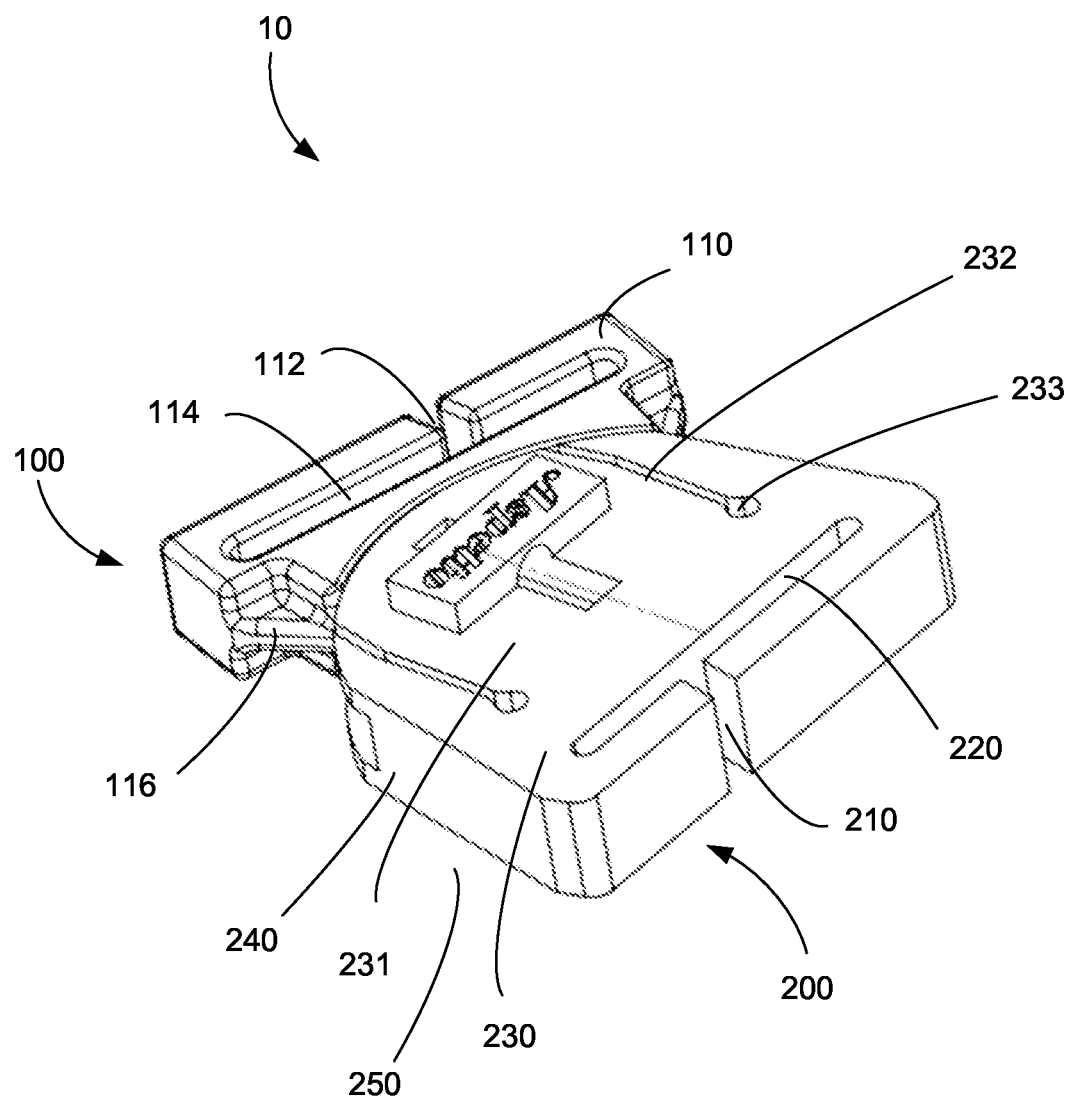
FIG. 5 shows a top isometric view of a quick-release latch in a connected position in accordance with one or more embodiments of the present disclosure.

As shown in FIG. 5, once male component 100 and female component 200 are connected, the two components may swivel or rotate horizontally with respect to one another. That is, the corresponding features of male component 100 and female component 200 (e.g., arc slot 130 and ball indent slot 140 of male component 100, and front lip 237 and protrusion 236 of female component 200) may enable male component 100 and female component 200 to swivel from side to side with respect to one another.

As male component 100 and female component 200 rotate with respect to one another, quick-release swivel latch 10 may approach a point at which rotation ceases. As discussed above, one or more side surfaces 240 of female component 200 may include a slight front inclination to help stop male component 100 from rotating any further in either direction. At that point, an end of arc slot 130 of male component 100 and a front edge of one or more side surfaces 240 of female component 200 may meet and fit tightly against one another, as shown in FIG. 5. This swivel or rotation feature provides a benefit of the engaged latch being able to move fluidly with a user's range of motion, which is especially helpful when quick-release swivel latch 10 is used on, for example, clothing or equipment used in particularly physical professions (e.g., body armor for law enforcement or military personnel).

To separate male component 100 from female component 200, a user may simply pull on cantilever wall 231 via a string, rope, or the like, fitted through hole 235. The pulling force on female component 200 may separate front lip 237 from arc slot 130, and protrusion 236 from ball indent slot 140, thus disengaging the two components. The same pulling force may separate the two components perpendicular to cantilever axis A1. Of course, for proper separation to occur, an anchor force opposite the pulling force would need to take place, such as when male component 100 is anchored to a fixed point, e.g., body armor. That is, when a user pulls on female component 200, portions of the body armor would become separated.

Although certain specific aspects of various example embodiments have been described, many additional modifications and variations would be apparent to those skilled in the art. In particular, any of the various processes described above may be performed in alternative sequences and/or in parallel (on different computing devices) in order to achieve similar results in a manner that is more appropriate to the requirements of a specific application. Thus, embodiments disclosed should be considered in all respects as examples and not restrictive. Accordingly, the scope of the inventions herein should be determined not by the embodiments illustrated, but by the appended claims and their equivalents.

In the present description, numerous specific details are set forth. However, it is to be understood that embodiments of the disclosed technology may be practiced without these specific details. In other instances, well-known methods, structures, and techniques have not been shown in detail in order not to obscure an understanding of this description. References to "one embodiment," "an embodiment," "example embodiment," "some embodiments," "certain embodiments," "various embodiments," etc., indicate that the embodiment(s) of the disclosed technology so described may include a particular feature, structure, or characteristic, but not every embodiment necessarily includes the particular feature, structure, or characteristic. Further, repeated use of the phrase "in one embodiment" does not necessarily refer to the same embodiment, although it may.

Unless otherwise noted, the terms used herein are to be understood according to conventional usage by those of ordinary skill in the relevant art. In addition to any definitions of terms provided below, it is to be understood that as used in the specification and in the claims, "a" or "an" can mean one or more, depending upon the context in which it is used. Throughout the specification and the claims, the following terms take at least the meanings explicitly associated herein, unless the context clearly dictates otherwise. The term "or" is intended to mean an inclusive "or." Further, the terms "a," "an," and "the" are intended to mean one or more unless specified otherwise or clear from the context to be directed to a singular form.

Unless otherwise specified, the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

Also, in describing example embodiments, certain terminology is used for the sake of clarity. It is intended that each term contemplates its broadest meaning as understood by those skilled in the art and includes all technical equivalents that operate in a similar manner to accomplish a similar purpose.

While certain embodiments of the disclosed technology have been described, it is to be understood that the disclosed technology is not to be limited to the disclosed example embodiments, but covers various modifications and equivalent arrangements included within the scope of the appended claims. Although specific terms are employed herein, they are used in a generic and descriptive sense only and not for purposes of limitation.

This written description uses examples to disclose certain embodiments of the disclosed technology, including the best mode, and to enable any person skilled in the art to practice the disclosed technology, including making and using any devices or systems and performing any incorporated methods. The patentable scope may include other examples that occur to those skilled in the art. Such other examples are intended to be within the scope of the claims if they have structural elements as the claims, or if they include equivalent structural elements with insubstantial differences from the literal language of the claims.

What is claimed is:

1. A swivel latch comprising:
 a male component comprising an insertable member having one or more cavities,
 a female component, the female component comprising a top surface, a bottom surface, and one or more side surfaces forming a receiving compartment configured to receive at least a portion of the insertable member of the male component,
 a central protrusion of the female component configured to engage the front section of the male component;
 an arc slot, wherein the arc slot engages a front lip of the female component and the arc slot allows the male and female components to swivel in at least one dimension relative to one another while remaining in the connected position, wherein:
the top surface comprises a cantilever wall positioned between a pair of slots;
the cantilever wall comprises a downwardly extending front lip and a downwardly extending protrusion; and
the front lip and the protrusion are configured to releasably engage with the one or more cavities of the insertable member of the male component.

2. The swivel latch of claim 1, wherein the cantilever wall extends along a longitudinal plane and comprises a through hole configured to receive a pulling cord for pulling at least a portion of the cantilever wall away from the longitudinal plane to quickly detach the male and female components.

3. The swivel latch of claim 1, wherein the one or more cavities of the insertable member of the male component comprise a ball indentation configured to receive the downwardly extending protrusion of the cantilever wall and an arc-shaped indentation configured to receive the downwardly extending front lip of the cantilever wall.

4. The swivel latch of claim 3, wherein the ball indentation and downwardly extending protrusion have correspondingly shaped circular cross-sections.

5. The swivel latch of claim 4, wherein the arc-shaped indentation and downwardly extending front lip have corresponding radial curvature formed along a longitudinal axis relative to the ball indentation and the downwardly extending protrusion, respectively.

6. The swivel latch of claim 5, wherein an arc length of the downwardly extending front lip is shorter than an arc length of the arc-shaped indentation.

7. The swivel latch of claim 5, wherein:
the arc-shaped indentation comprises a vertically extending front contact wall, a bottom surface extending in parallel to the longitudinal axis, and a rounded back wall;
the downwardly extending front lip comprises a vertically extending rear contact wall, a bottom surface extending in parallel to the longitudinal axis, and a rounded front edge; and
when the male and female components are attached, the rear contact wall of the front lip is positioned adjacent the front contact wall of the arc-shaped indentation, the bottom surface of the front lip is positioned adjacent the bottom surface of the arc-shaped indentation, and the rounded front edge of the front lip is positioned adjacent the rounded back wall of the arc-shaped indentation.

8. The swivel latch of claim 7, wherein the insertable portion of the male component further comprises a flat surface having a first vertical thickness and at least a portion of a non-insertable portion of the male component proximate the rounded back wall of the arc-shaped indentation has a second vertical thickness greater than the first vertical thickness.

9. The swivel latch of claim 8, wherein a vertical height of the receiving compartment of the female component is greater than the first vertical thickness and less than the second vertical thickness.

10. The swivel latch of claim 1, wherein the one or more cavities of the insertable member of the male component comprise:
an upper surface having a first ball indentation configured to receive the downwardly extending protrusion of the cantilever wall and a first arc-shaped indentation configured to receive the downwardly extending front lip of the cantilever wall; and
a lower surface having a second ball indentation configured to receive the downwardly extending protrusion of the cantilever wall and a second arc-shaped indentation configured to receive the downwardly extending front lip of the cantilever wall.

11. The swivel latch of claim 1, wherein the top surfaces and bottom surfaces of the male component are reversible so that the male component may engage with female component regardless of which side of male component is facing up or down.

12. A quick-release swivel latch comprising:
a male component comprising an insertable member having at least one surface comprising a radial arc-shaped slot and a circular slot; and
a female component comprising a top surface, a bottom surface, and one or more side surfaces forming a receiving compartment, the top surface comprising a cantilever wall, a front lip configured to selectively engage the arc-shaped slot of the male component, and a central protrusion configured to selectively engage the circular slot of the male component, wherein:
the front lip of the female component is movable along a curvature of the arc-shaped slot of the male component to swivel the male component relative to the female component;
When the male and female components are in a connected position such that the central protrusion and front lip of the female component engages the ball indent and arc slot of the male component, respectively, the male and female components can swivel in at least one dimension relative to one another while remaining in the connected position; and
the cantilever wall extends along a longitudinal plane of the insertable member and is configured to be pulled outwardly away from the longitudinal plane to selectively disengage at least the front lip of the female component from the arc-shaped slot of the male component.

13. The quick-release swivel latch of claim 12, wherein the circular slot and protrusion have correspondingly shaped circular cross-sections.

14. The quick-release swivel latch of claim 12, wherein the arc-shaped slot and front lip have corresponding radial curvature formed along a longitudinal axis relative to the circular slot and the protrusion, respectively.

15. The quick-release swivel latch of claim 14, wherein an arc length of the front lip is shorter than an arc length of the arc-shaped slot.

16. The quick-release swivel latch of claim 14, wherein:
the arc-shaped slot comprises a vertically extending front contact wall, a bottom surface extending in parallel to the longitudinal axis, and a rounded back wall;
the front lip comprises a vertically extending rear contact wall, a bottom surface extending in parallel to the longitudinal axis, and a rounded front edge; and
when the male and female components are attached, the rear contact wall of the front lip is positioned adjacent the front contact wall of the arc-shaped slot, the bottom surface of the front lip is positioned adjacent the bottom surface of the arc-shaped slot, and the rounded front edge of the front lip is positioned adjacent the rounded back wall of the arc-shaped slot.

17. The quick-release swivel latch of claim 16, wherein:
the insertable member of the male component further comprises a flat surface having a first vertical thickness;
at least a portion of a non-insertable portion of the male component proximate the rounded back wall of the arc-shaped slot has a second vertical thickness greater than the first vertical thickness; and
a vertical height of the receiving compartment of the female component is greater than the first vertical thickness and less than the second vertical thickness.

18. The quick-release swivel latch of claim 12, wherein:
the male component further comprises a non-insertable portion having a first attachment body partially enclosing a first strap slot and forming a first mouth slot angled non-perpendicularly to the first strap slot; and
the female component further comprises a second attachment body partially enclosing a second strap slot and forming a second mouth slot angled non-perpendicularly to the second strap slot.

19. A swivel latch comprising:
a male component comprising an insertable portion having a first outer surface with at least one arc-shaped cavity; and
a female component comprising a top surface, a bottom surface, and one or more side surfaces forming a receiving compartment configured to receive at least a portion of the insertable portion of the male component,
a central protrusion of the female component configured to hold the front section of the male component stationary during swivel of the male component relative to the female component, wherein:
the top surface comprises a downwardly extending front lip configured to fit within the at least one arc-shaped cavity of the male component when the male component is attached to the female component;
the front lip is configured to move along a curvature of the at least one arc-shaped cavity of the male component to allow the male component to swivel relative to the female component; and
the front lip extends from an outwardly moveable portion of the top surface such that the front lip is configured to withdraw from the at least one arc-shaped cavity of the male component to detach the male component from the female component.

20. The swivel latch of claim 19, wherein:
the male component further comprises a non-insertable portion having a first attachment body partially enclosing a first strap slot and forming a first mouth slot angled non-perpendicularly to the first strap slot; and
the female component further comprises a second attachment body partially enclosing a second strap slot and forming a second mouth slot angled non-perpendicularly to the second strap slot.

* * * * *